United States Patent [19]

Swanson

[11] Patent Number: 4,619,577
[45] Date of Patent: Oct. 28, 1986

[54] SWEEP AUGER

[76] Inventor: Lynos Swanson, R.R. #1, Lawton, N. Dak. 58345

[21] Appl. No.: 673,280

[22] Filed: Nov. 20, 1984

[51] Int. Cl.⁴ ............................................ B65G 65/46
[52] U.S. Cl. .................................... 414/312; 414/310; 198/587
[58] Field of Search ............... 414/310, 311, 312, 319, 414/320, 321; 198/518, 587, 594, 608, 668

[56] References Cited

U.S. PATENT DOCUMENTS

| | | | |
|---|---|---|---|
| 1,564,187 | 12/1925 | Ahrens | 414/310 |
| 1,689,963 | 10/1928 | Pelton | 198/668 |
| 2,058,125 | 10/1936 | Bean | 198/213 |
| 2,393,572 | 1/1946 | Soma | 198/213 |
| 2,662,623 | 12/1953 | Tintes | 198/93 |
| 2,711,814 | 6/1955 | McCarthy | 198/64 |
| 2,763,362 | 9/1956 | Greaves | 198/213 |
| 2,790,563 | 4/1957 | McCarthy | 414/312 |
| 3,014,575 | 12/1961 | Klein | 198/213 |
| 3,076,567 | 2/1963 | O'Dell | 414/310 |
| 3,241,657 | 3/1966 | Buschbom | 198/668 X |
| 3,331,640 | 7/1967 | Prentice | 302/56 |
| 3,381,802 | 5/1968 | Levadney et al. | 198/213 |
| 3,493,130 | 2/1970 | Laidig | 414/311 |

Primary Examiner—Robert J. Spar
Assistant Examiner—Stuart J. Millman
Attorney, Agent, or Firm—Kinney & Lange

[57] ABSTRACT

A sweep auger attachment for use in combination with an unloading conveyor. The sweep auger includes a first auger coupled to a second auger. A backboard, for directing grain into engagement with the augers extends along one side of the first and second augers. The first auger is rotatably mounted by a bracket to the backboard. A support arm, mounted on the backboard, supports the second auger. The sweep auger is selectively pivotally mounted on the loading conveyor between a first and a second position. The sweep auger longitudinal plane, defined by the axes of the first and second augers, is offset with respect to the pivot axis in the first position, and aligned with the pivot axis in the second position.

11 Claims, 10 Drawing Figures

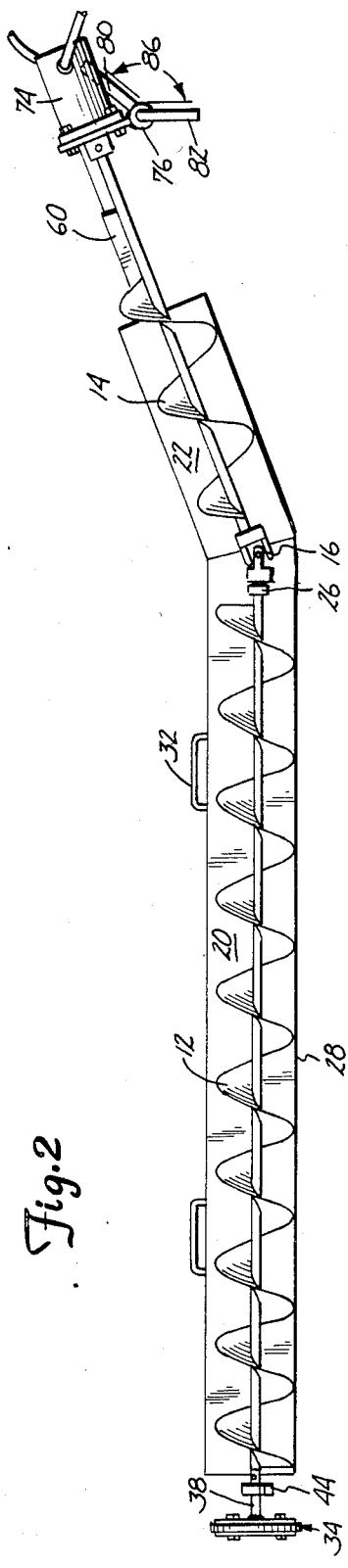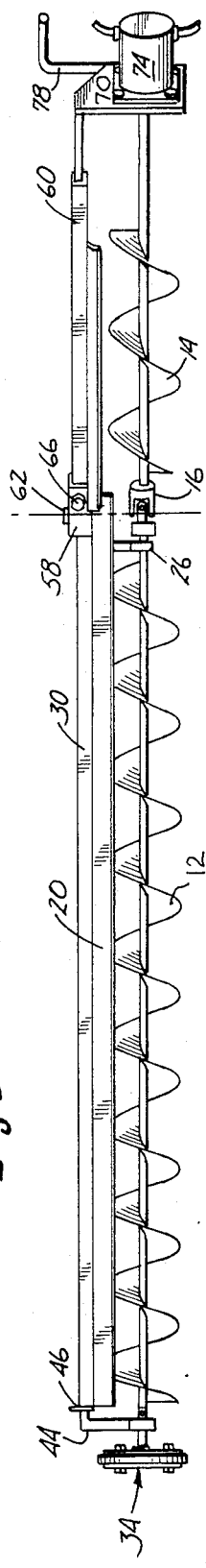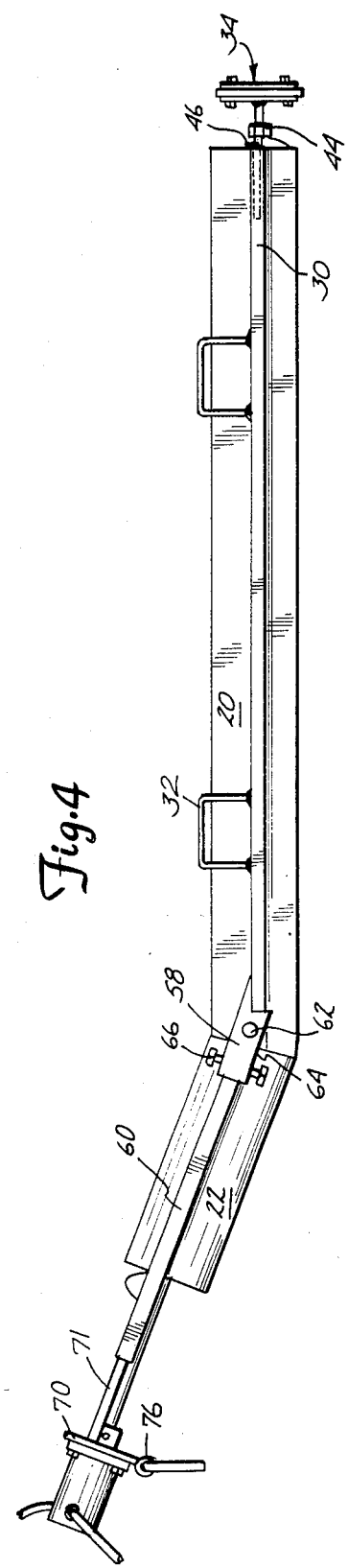

SWEEP AUGER

BACKGROUND OF THE INVENTION

1. Field of the Invention

The present invention relates generally to an auger for removing grain from a storage bin and, particularly, to a sweep auger attachment pivotally mounted on an unloading conveyor to draw grain from the outer edges of the bin to a loading end of the unloading conveyor.

2. Description of the Prior Art

Various types of conveyors have been developed for removing grain or other material from bins, tanks or platforms. U.S. Pat. No. 2,393,572 to Soma and U.S. Pat. No. 1,564,187 to Ahrens disclose conveyors having an open auger universally joined to an enclosed auger. The open auger is manually moved around a bin to engage and convey material to the enclosed auger, which transports the material out of the bin. Movement of the open auger about the bin is limited by the universal joint connection, requiring periodic repositioning of enclosed auger to completely clean the bin.

U.S. Pat. No. 3,381,802 to Levadney, et al. describes a conveyor having a first horizontally disposed auger universally joined to a second auger held in a fixed angular relation with respect to the first auger. U.S. Pat. No. 2,058,125 to Bean discloses a freight car unloading conveyor having a plurality of universally joined augers universally connected to a movable base. Both the Levadney et al. and Bean conveyors must be continually manipulated into engagement with the material to be moved.

U.S. Pat. No. 2,790,563 to McCarthy, U.S. Pat. No. 2,711,814 to McCarthy and U.S. Pat. No. 2,763,362 to Greaves describe auger arrangements for removing grain from circular storage bins. The Greaves conveyor apparatus includes a plurality of augers universally joined together in tandem. The augers are initially positioned diametrically across the grain bin and are gradually moved to one side of the bin, removing the grain or other material from the bin as they move. The auger sections are also folded as they move to approximate the shape of the inner wall of the storage bin. When half of the bin has been cleaned in such a manner, the auger sections are repositioned at the center of the bin and rotated to the other side of the bin.

The apparatus described in McCarthy U.S. Pat. No. 2,790,563 comprises two independently driven auger mechanisms mounted to a turnplate mechanism. One auger mechanism is mounted on the storage bin wall and projects into the storage bin. A second auger mechanism rotates about the turnplate mechanism to draw the grain at the outer edges of the bin to the first auger mechanism which in turn draws the grain to an opening in the floor of the bin. McCarthy U.S. Pat. No. 2,711,814 describes a conveyor having an auger pivotally mounted to a pivot support extending through an opening in the floor of a bin. The auger rotates about the pivot support in the bottom of the tank, conveying grain to the opening. Both McCarthy conveyors are limited to use with bins having such openings in their floors.

U.S. Pat. No. 3,114,575 to Klein describes a jointed conveyor connecting a swing hopper to the lower end of an auger elevator. U.S. Pat. No. 3,331,640 to Prentice describes a silo unloader which utilizes an auger to convey material to a blower mechanism, which in turn propels the material out of the silo. U.S. Pat. No. 2,662,634 to Tintes describes an auxiliary conveyor attachment mounted on a conventional elevator conveyor which extends the location of a material receiving hopper.

SUMMARY OF THE INVENTION

The present invention includes an elongated sweep auger attachment for use in combination with an unloading conveyor. The sweep auger is designed to draw material at the outer edges of the bin to the unloading conveyor, which in turn removes the material from the bin. The sweep auger includes auger means, including at least one auger section. A backboard extends along one side of the auger means which directs grain into the space between the auger means and the backboard. A bracket carried by the backboard rotatably supports a first end of the auger means. A support arm, carried by the backboard, supports a second end of the auger means. The sweep auger is selectively pivotally mounted on the unloading conveyor between a first and a second position. The sweep auger longitudinal plane, a substantially vertical plane containing the longitudinal axis of at least one auger section, is offset with respect to the pivot axis in the first position and is substantially aligned with the pivot axis in the second position.

BRIEF DESCRIPTION OF THE DRAWINGS

FIG. 2 is a front view of the sweep auger attachment;

FIG. 3 is a top plan view of the sweep auger attachment;

FIG. 4 is an elevational back view of the back side of the sweep auger attachment;

DETAILED DESCRIPTION OF THE PREFERRED EMBODIMENTS

Figure 1A:
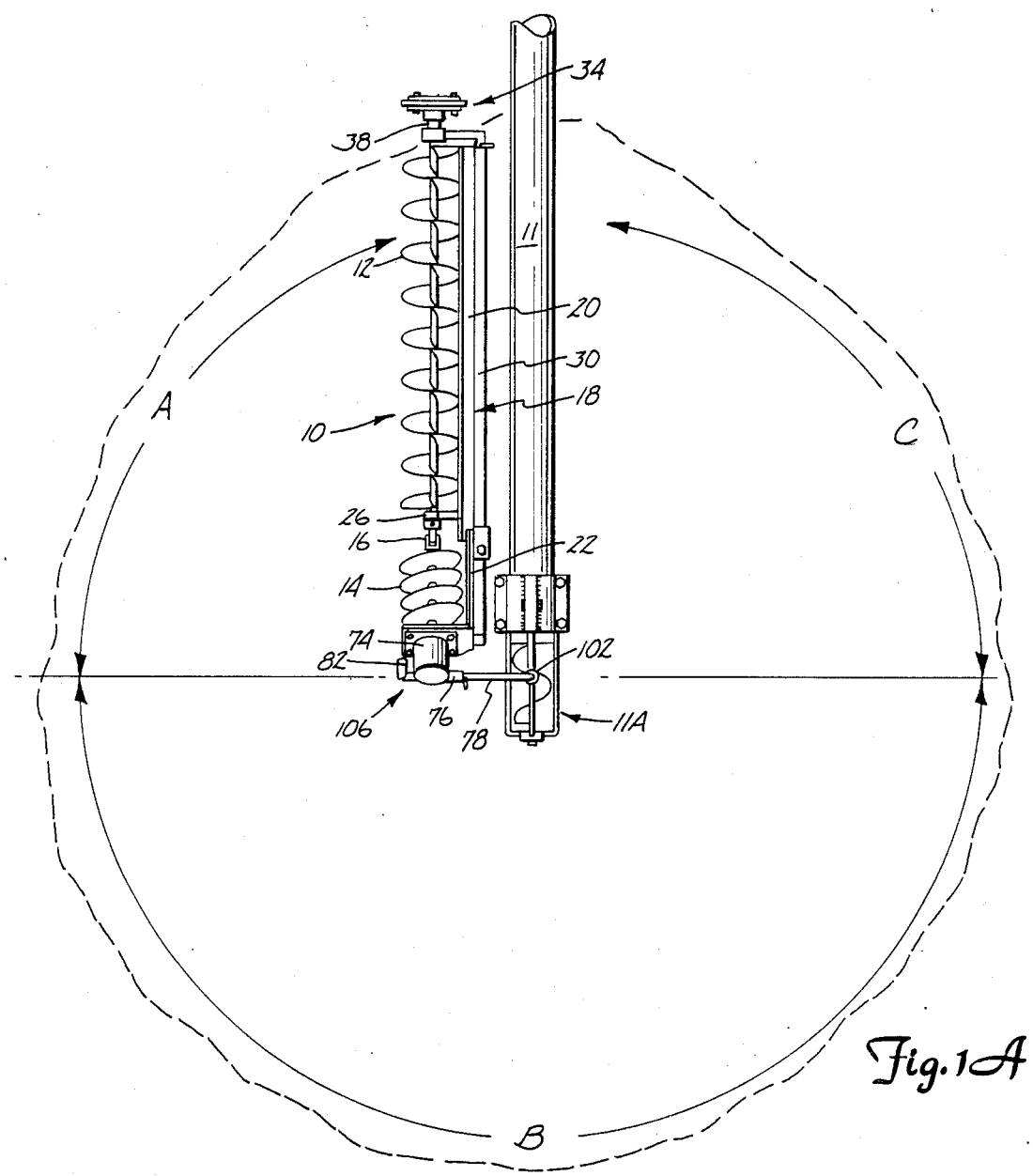
FIG. 1A is a top view of a preferred embodiment of the sweep auger attachment of the present invention, pivotally mounted in a first position on a loading end of an unloading auger conveyor.

A preferred embodiment of the portable, elongated sweep auger attachment 10 of the present invention is generally illustrated in FIG. 1A, pivotally mounted to a loading end 11A of an unloading conveyor 11 in a first mount position. Unloading conveyor 11, although illustrated as a screw conveyor, may be any conventional conveyor which can be utilized to convey material or grain from a bin or platform.

Sweep auger 10 includes a first auger section 12 coupled to a second auger section 14 by a universal joint 16. Extending along one side of the auger sections is a backboard or sweep plate assembly 18. Backboard 18 includes an elongated, upright first plate 20 connected to an inclined second plate 22. Plate 22 is preferably disposed at an angle of about 25° relative to plate 20 as shown by arrow 24 in FIG. 5. Brackets 26, carried by first plate 20, rotatably support first auger section 12 substantially parallel to first plate 20, with second auger 14 extending laterally adjacent second plate 22, as shown in FIG. 3.

Plates 20 and 22 preferably have a generally arcuate cross section, with their concave surfaces facing the first and second auger sections. A ground engaging edge 28, defined along a lower longitudinal edge of first plate 20, acts as a lip to guide grain into the space between the first and second auger sections and backboard 18. Fixed to the back side of backboard 18 is a reinforcing tube 30, preferably of rectangular cross-section, which also provides a support for a sweep auger extension or a drive mechanism, as discussed subsequently. Fixed to and upwardly extending from reinforcing tube 30 are conveniently disposed handles 32, to assist the operator in positioning or manipulating the sweep auger attachment 10.

Axially aligned and releasably operatively connected to an outer end of first auger section 12 is a drive wheel 34. Drive wheel 34 is driven from a shaft 38, as indicated in FIG. 3. The diameter of drive wheel 34 is slightly larger than the diameter of the auger sections to support the auger slightly off the bin floor. Drive wheel 34 is supported by a first support arm 44 that rotatably mounts shaft 38. Arm 44 is slidably engaged within tube 30 and releasably fixed in place by a cotter key 46 or other suitable means. First support arm 44 has a cross section which prevents it from rotating within the bore of tube 30. Shaft 38 is releasably drivably connected to auger 12 in any suitable manner, so that it rotates with the auger sections and is partially supported by the auger sections.

Figure 8:
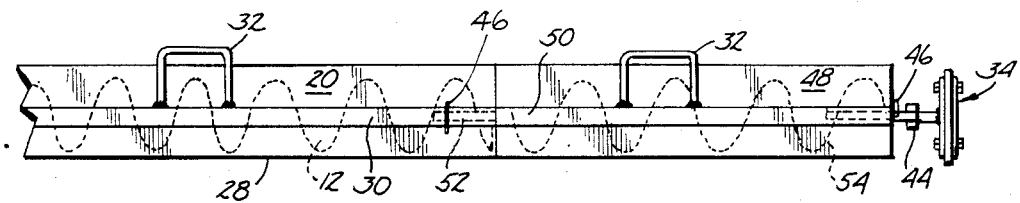
FIG. 8 is an elevational view of a portion of the back side of the sweep auger attachment having an extension section attached thereto.
Figure 9:
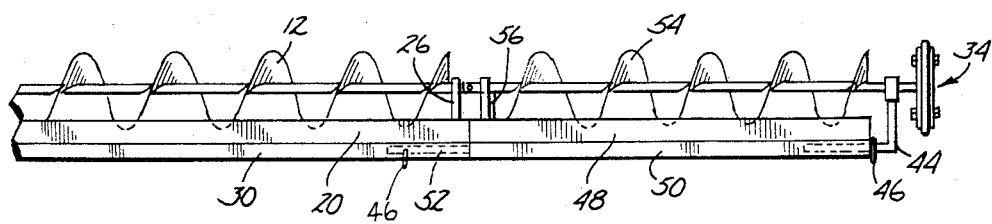
FIG. 9 is a top view of the portion of the sweep auger attachment and the extension section of FIG. 8.

Sweep auger 10 may be extended for use in larger bins if desired. To extend sweep auger 10, as illustrated in FIGS. 8 and 9, drive wheel 34 and first support arm 44 are disconnected from their mounts and removed. Backboard 18 is extended by axially adding an extension plate 48 of arcuate cross section to plate 20. Extension plate 48 also includes a reinforcing tube 50 extending along its back with a portion 52 extending beyond one of the ends of plate 48. Portion 52 has a reduced cross section arranged to mate in cross section with the first reinforcing tube 30. A cotter key 46 or other suitable means releasably secures portion 52 within tube 30, fixing plate 48 in axial alignment with first plate 20.

Similarly, a third auger section 54 is operatively connected in any suitable manner to a terminal end of auger 12, and rotatably mounted on third plate 48 by a second set of support brackets 56, as shown in FIG. 9. Additional plates 48 and auger sections 54 may be added in a similar manner until the desired sweep auger length is reached. Drive wheel 34 and support arm 44 are then reconnected to auger 54 and tube 50, respectively, in the same manner as they were connected to auger 12 and tube 30.

Figure 6:
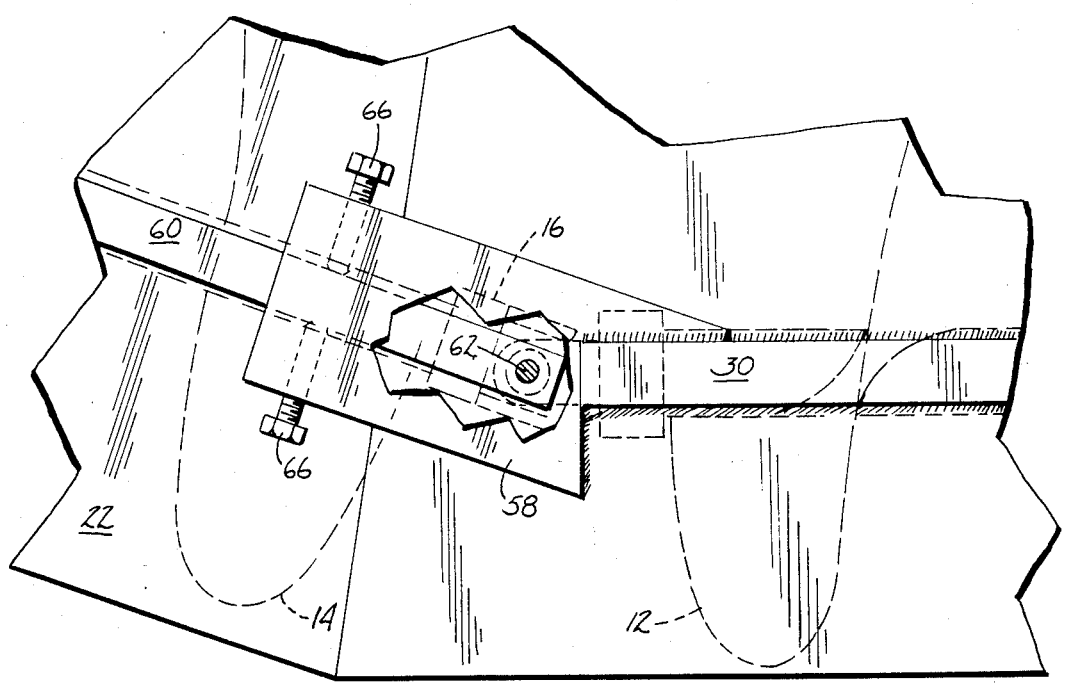
FIG. 6 is an elevational view of a portion of the back side of the sweep auger attachment illustrating a support arm pivotally mounted on a backboard mechanism in adjustable angular disposition.

A first sleeve 58 is fixed to backboard 18 at the inner end of the backboard to receive a second tubular support arm 60, as illustrated in FIGS. 4 and 6. One end of second support arm 60 is pivotally mounted within sleeve 58 by a bolt 62. The cross section of sleeve 58 is substantially larger than the cross section of support arm 60 to maximize the arc through which support arm 60 may rotate before it engages the side walls 64 of sleeve 58. To fix the position of support arm 60 relative to backboard 18, sleeve 58 further includes a pair of transversely disposed cap screws 66, which may be adjusted as needed to adjust the pitch of support arm 60 relative to backboard 18.

A mounting plate 70 is carried by support arm 60 on a arm section 71 that telescopes relative to support arm 60 as shown in FIG. 4. An auger drive motor, such as hydraulic motor 74, is mounted as at 72 on the plate 70. Motor 74 has an output shaft coupled to second auger 14 to drive the first and second auger sections and drive wheel 34. Motor 74 further fixes the position of one end of second auger 14 relative to support arm 60, so that adjustment of the pitch of support arm 60 will adjust the angular disposition of second auger 14 relative to first auger 12. Adjustment of the pitch of support arm 60 makes it possible to mount sweep auger 10 to unloading conveyors 11 of various diameters or heights.

Figure 5:
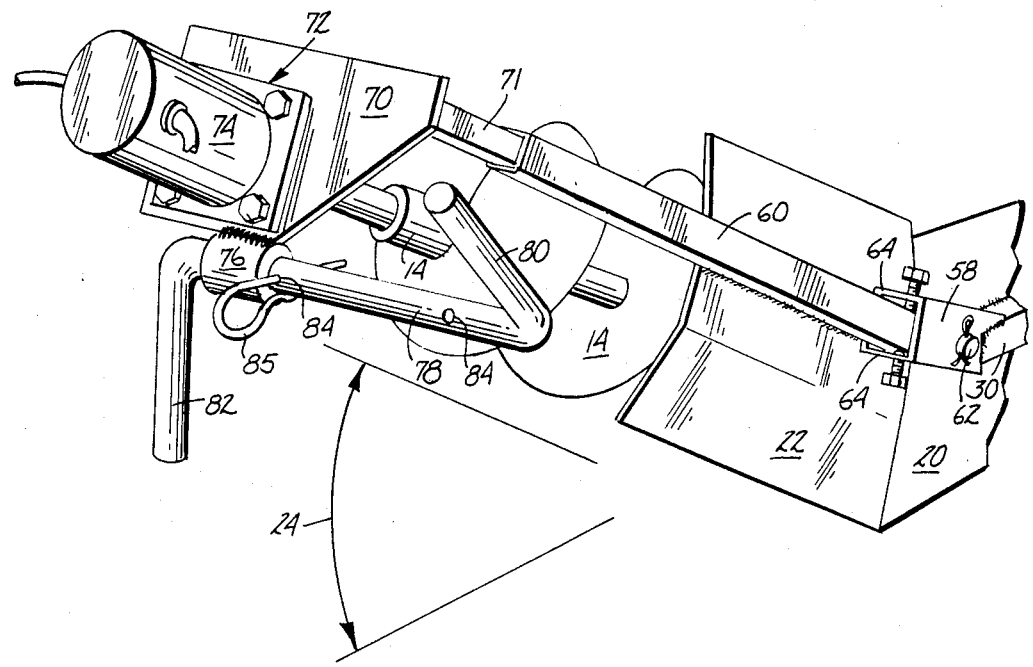
FIG. 5 is a perspective view of the pivot end of the sweep auger attachment illustrating a motor mount plate and a pivot pin assembly slidably and rotatably mounted thereto.

Fixed to mounting plate 70 is a second sleeve 76 for slidably, adjustably receiving a support bar 78. Support bar 78 has a cross section which permits it to be rotated within the sleeve 76. Support bar 78 includes a first pivot pin 80 and second pivot pin 82 mounted on and transversely extending from opposite ends of the support bar 78. It is preferred that the axes of first pin 80 and second pin 82 extend from support bar 78 at an angle of 135° relative to each other, as indicated by arrows 86 in FIG. 2. This arrangement prevents the pivot pin which is not in use from interfering with the rotation of the sweep auger 10 about unloading conveyor 11, as will be seen. Support bar 78 further includes at least two transverse bores 84 extending therethrough near each end of bar 78. A spring clip 85, inserted through a selected bore, releasably fixes the axial position of support bar 78 relative to sleeve 76 as illustrated in FIG. 5.

Figure 7:
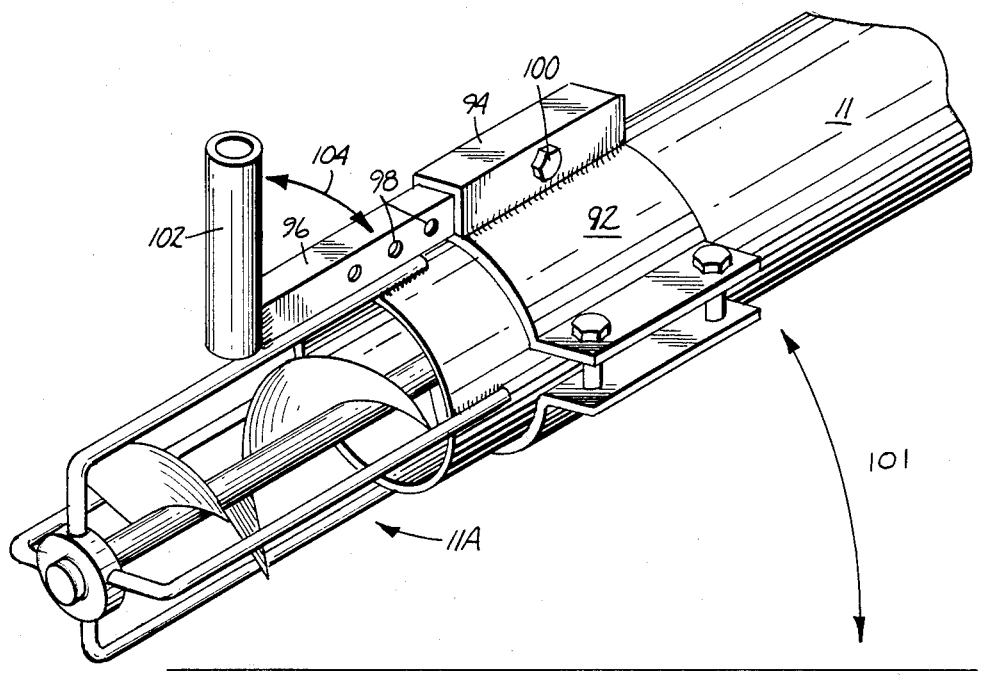
FIG. 7 is a perspective view of a universal mounting mechanism of the present invention clamped to the loading end of the unloading conveyor.

A universal mount, illustrated in FIG. 7, is provided for pivotally mounting the sweep auger 10 on unloading conveyor 11. The mount includes a split clamp 92 that clamps around the outer tube of unloading conveyor 11. The clamp 92 as shown is used for screw conveyors (augers rotatably mounted within a housing of circular cross section), but other clamps may be used for attachment to other types of conveyors. A third sleeve 94, preferably of rectangular cross section, is fixed to the clamp 92. A third support arm 96, having a plurality of transverse bores 98, is adjustably slidably mounted within sleeve 94 and releasably fixed in place by a bolt or pin 100 as shown. Carried at one end of second support arm 96 is a pivot socket or tube 102 arranged to pivotally receive pivot pin 80 or 82.

Second support arm 96 is preferably positioned so that pivot socket 102 extends over an open or loading end 11A of the unloading conveyor 11, for maximum loading capability. Unloading conveyor 11 is typically disposed at a 20° angle relative to the surface of the bin or platform, as shown by arrow 101. Therefore, pivot socket 102 is preferably disposed at an angle of 70° relative to the third support arm 96, as illustrated at 104, in order to provide a substantially vertical pivot axis relative to the bin floor.

In operation, support bar 78 is initially fixed so pivot pin 82 is adjacent the sleeve 76 and pin 80 is spaced laterally from the sweep auger. The pin 80 is placed in socket 102 and the sweep auger 10 is folded to be laterally adjacent unloading conveyor 11 as shown in FIG. 1A. When motor 74 is actuated, it rotates the first and second auger sections and drive wheel 34, rotating sweep auger sections 12 and 14 about their axes and tending to drive sweep auger 10 counterclockwise about the axis of pin 80. Backboard 18 is moved along over the bin floor and provides a conveyor backboard for grain so the grain is moved by the auger section and not merely thrown out behind the auger. The pivotal connection between second sleeve 76 and support bar 78 permits changes in the pitch of sweep auger 10 relative to the bin floor to adjust for uneven floors or material orientation. In this mounting position, material engaged by sweep auger 10 will be transported to a pivot end 106 of the sweep auger 10, adjacent the loading end 11A of unloading conveyor 11. Conveyor 11, in turn, transports the material out of the bin.

The sweep auger is self-controlling. That is, the drive wheel 34 will tend to slip on the bin floor until the grain has been removed so the auger can be urged ahead. The sweep auger thus tends to "eat" into the pile of grain in the bin.

Figure 1B:
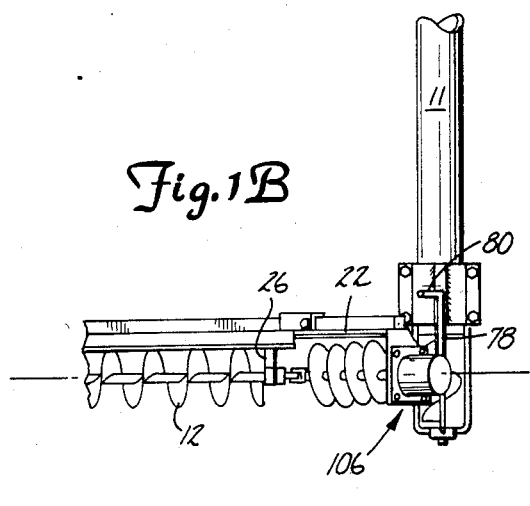
FIG. 1B is a fragmentary detail of a pivot end of the sweep auger pivotally mounted on the loading end of the unloading conveyor in a second mount position.

When sweep auger 10 has rotated 90° (arc A of FIG. 1), and is generally perpendicular to the longitudinal axis of the unloading conveyor 11, the sweep auger 10 is repositioned as shown in FIG. 1B. To shift to this position, pivot pin 80 is pulled clear of socket 102, support bar 78 is rotated and sweep auger 10 is maneuvered so that pivot pin 82 is pivotally engaged within socket 102. In this position, the pivot axis defined by pin 82 and socket 102 lies on a plane defined by the axes of auger sections 12 and 14. The relative orientation of pivot pins 80 and 82 assures that pin 82 will project away from unloading conveyor 11, so as not to interfere with the rotation of sweep auger 10. Sweep auger 10 is then driven with motor 74 and the auger sections 12 and 14 will rotate as the sweep auger pivots counterclockwise for approximately 180° (arc B in FIG. 1) in this mount position, moving the material directly into the loading end 11A of unloading conveyor 11. In this position, the inner end of auger section 14 is above the end of conveyor 11.

Figure 1C:
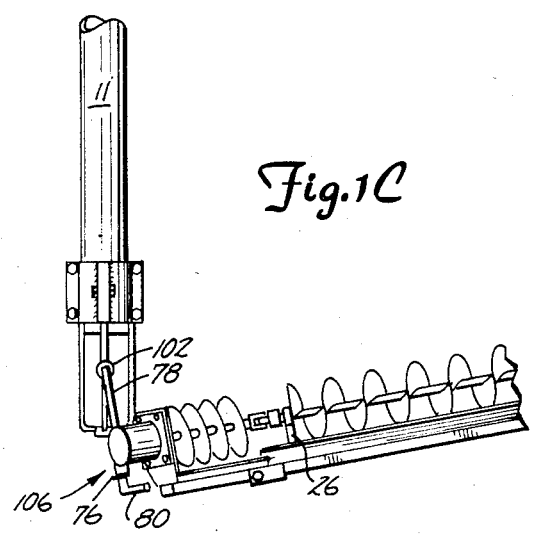
FIG. 1C is a view similar to FIG. 1B, illustrating the sweep auger in another mount position.

After sweep auger 10 has rotated through arc B, it is again repositioned as illustrated in FIG. 1C. This time, pin 85 is removed and the pivot end 106 of sweep auger 10 is slid along support bar 78 until second sleeve 76 is adjacent pivot pin 80. Pin 85 is then selectively repositioned to fix the axial position of sleeve 76 relative to arm 78. In this position, the inner end 106 of sweep auger 10 is again offset from the pivot axis so that the longitudinal plane of sweep auger 10 (defined by the axes of auger sections 12 and 14) is offset from the axis of pin 82 and socket 102. This plane is substantially vertical with respect to the bin surface. Material moved by the sweep auger 10 will again be moved to a point laterally adjacent loading end 11A of unloading conveyor 11. In this mount position, the sweep auger 10 is driven counterclockwise until it is laterally adjacent the opposite side of unloading conveyor 11 from which it started, as indicated by arc C in FIG. 1A.

The two mount positions of the sweep auger 10, with its longitudinal plane offset or aligned with the pivot axis of the sweep auger relative to conveyor 11, permits substantially 360° pivoting about loading end 11A of unloading conveyor 11, so that the entire bin may be throughly cleaned. Sweep auger 10 is readily portable and universally mountable to all unloading conveyors by simply modifying the mounting clamp 92. When used in combination with a portable unloading conveyor, the present invention may clean a multitude of various sized bins, so that an independent auger system for each bin is no longer necessary.

Although the present invention has been described with reference to preferred embodiments, workers skilled in the art will recognize that changes may be made in form and detail without departing from the spirit and scope of the invention.

What is claimed is:

1. An elongated sweep auger attachment for use in combination with unloading conveyor means comprising:
   auger means including at least one auger section;
   backboard means extending along one side of the auger means;
   drive means supported by the backboard means and operatively connected to the auger means;
   bracket means carried by the backboard means for rotatably supporting a first end of the auger means;
   support means carried by the backboard means, supporting a second end of the auger means; and
   means for selectively pivotally mounting the sweep auger attachment on the unloading conveyor means about a pivot axis in a first and a second position, the sweep auger having a longitudinal plane which is parallel to the pivot axis and contains the longitudinal axis of at least one auger section, the pivot axis being offset with respect to the longitudinal plane in the first position and lying substantially in such plane in the second position.

2. The sweep auger of claim 1 wherein the support means comprises:
   a support bar pivotally mounted on the backboard means in adjustable angular disposition relative thereto, and the drive means includes motor means carried by the support bar in operative engagement with the auger means.

3. The sweep auger of claim 2 wherein:
   the backboard means includes an elongated first plate angularly connected to a second plate; and
   the auger means includes a first auger section rotatably mounted on the first plate by the bracket means, and a second auger section coupled to the first auger section, disposed adjacent the second plate, and operatively connected to the motor means; and
   the sweep auger longitudinal plane is defined by the intersecting axes of the first and second auger sections.

4. The sweep auger of claim 2 wherein:
   the first and second auger sections are coupled together by universal joint means having a pair of intersecting axes; and
   the point of intersection of the axes of the universal joint means lies along the pivot axis of the support bar.

5. The sweep auger of claim 1 wherein the means for selectively pivotally mounting comprises:
   means carried by the support means for receiving slide bar means;
   slide bar means slidably and revolvably mounted on the means for receiving, and having pivot pins radially extending from the axis of the slide bar means at opposite ends thereof; and pivot pin receiving means adjustably mounted to the unloading conveyor for pivotally engaging the pivot pins.

6. The sweep auger of claim 1 further comprising an extension auger means aligned with and secured to the sweep auger attachment to rotate with the sweep auger attachment.

7. The sweep auger of claim 1 wherein the drive means comprises a removable wheel member of diameter greater than the diameter of the first auger section end, coaxially and operatively mounted on an outer end of the first auger section.

8. The sweep auger of claim 1 further comprising means for structurally reinforcing the backboard means.

9. A sweep auger attachment for use in combination with unloading conveyor means, comprising:

backboard means comprising a first and a second upright plate angularly joined together;

bracket means carried by the first plate for pivotally supporting auger means;

auger means including a first and a second auger section coupled together, the first auger section being rotatably mounted on the bracket means with the second auger section disposed adjacent the second plate;

drive means operatively connected to the auger means;

support means mounted on the backboard means for supporting the second auger section in adjustable angular disposition relative to the first auger section; and means for pivotally mounting the sweep auger attachment on the unloading conveyor means.

10. The sweep auger of claim 9 wherein the support means comprises:

a support bar pivotally mounted on the backboard means in adjustable angular disposition relative thereto, and motor means carried by the support bar in operative engagement with the second auger section.

11. An elongated sweep auger attachment for use in combination with unloading conveyor means, comprising:

backboard means having an elongated first plate and an inclined second plate extending upwardly from said first plate;

bracket means carried by the first plate for rotatably supporting first auger means in substantially parallel alignment therewith;

first auger means rotatably mounted on the bracket means;

second auger means;

universal joint means tandemly joining the first and second auger means, the second auger means being disposed adjacent the second plate;

support means mounted on the backboard means for supporting the second auger means in adjustable angular disposition relative to the first auger means;

means for selectively pivotally mounting the sweep auger attachment on the unloading conveyor means between a first and a second position with respect to the pivot axis, the sweep auger longitudinal plane, which is a substantially vertical plane containing the longitudinal axis of at least one auger section, being offset with respect to the pivot axis in the first position and being aligned with the pivot axis in the second position.

* * * * *